INVENTOR.
DANIEL M. MITCHELL

BY *Moody and Phillion*
ATTORNEYS

INVENTOR.
DANIEL M. MITCHELL
BY Moody and Phillion
ATTORNEYS

United States Patent Office 3,441,862
Patented Apr. 29, 1969

3,441,862

BI-PHASE DEMODULATING CIRCUIT INDEPENDENT OF REFERENCE SIGNAL AMPLITUDE DISTORTION

Daniel M. Mitchell, Marion, Iowa, assignor to Collins Radio Company, Cedar Rapids, Iowa, a corporation of Iowa Filed Mar. 21, 1966, Ser. No. 536,101
Int. Cl. H03d *3/18, 1/18*
U.S. Cl. 329—50 4 Claims

ABSTRACT OF THE DISCLOSURE

A phase detector comprising a transistor with the base electrode D-C biased to about the center of its operating range, and a voltage divider comprised of first and second resistors with a tap therebetween connected to the transistor base. A reference signal supplied through a diode to one end terminal of the voltage divider means is of sufficient magnitude to drive said transistor into saturation during that half cycle thereof when the diode is caused to be conducted. A second input signal is supplied to the other terminal of the voltage divider through coupling means and functions to control the level of conductivity of said transistor during that portion of the half cycle thereof coincided with that half cycle of said first signal which is blocked from the transistor. The average D-C voltage of the transistor collector is indicative of the phase relation.

This invention relates generally to bi-phase demodulating circuits employing reference signals and, more particularly, to a bi-phase demodulator circuit which is substantially independent of amplitude distortion of the reference signal.

In the prior art there are many types of phase demodulating circuits. Some phase demodulators employ reference signals and others do not. Of those that employ reference signals the reliability of the circuit is, to a degree, dependent upon the integrity of the reference signal. More specifically, the reference signal and the input signal are compared in the demodulating circuit and a D-C output signal is produced, the magnitude of which depends upon the phase relationship of the reference and input signals. However, if the amplitude of the reference signal varies the D-C output will also vary therewith to produce distortion.

In some applications a sufficiently good reference signal can be obtained from some point in the radio equipment employed at hand. That is to say, it is possible in many cases to obtain a ready-made reference signal from some point in the equipment of which the phase demodulating circuit is a part. In other cases, however, the accuracy of the phase demodulating circuit requires that the reference signal be controlled in order to meet predetermined signal-to-noise standards. In such cases a separate circuit is sometimes required to produce a reference signal which has the stability needed in the particular application.

An object of the present invention is to provide a bi-phase demodulating circuit in which the output thereof is not appreciably affected by amplitude variations (distortions) existing in the reference signal.

A second purpose of the invention is to provide a reliable and inexpensive bi-phase demodulator circuit which is independent of reference signal amplitude distortion.

A third object of the invention is the improvement of bi-phase demodulating circuits generally.

In accordance with the invention there is provided an electron valve having an electron emitting electrode, an electron collecting electrode and an electron control electrode. A first, a second, and a third resistor means are connected in series in the order given between a battery source and ground potential and function as a voltage divider, with the said collector electrode connected to a point between the first resistor, which comprises a collector load resistor, and the second resistor. The said control electrode means is connected to a point between the said second resistor and the third resistor to bias said electron valve to approximately cut-off point.

The modulated input signal is supplied to said control electrode through coupling means comprising a coupling capacitor and a fourth resistor means. A reference signal is also supplied to said control electrode through a coupling means comprising a diode which is poled to pass excursions of the reference signal which function to saturate said electron valve but which will block those excursions of the reference signal which would function to cut off said electron valves. The frequency of the reference voltage is the same as that of the modulated input signal. In one form of the invention to be described herein the phase of the modulated input signal will always be the same as that of the reference voltage or, alternatively, will be 180° out-of-phase with the phase of said reference voltage.

Either NPN or PNP transistors can be employed herein. Assume that an NPN type transistor is employed as the electron valve so that during the positive excursion of the reference voltage, the transistor is saturated and the potential of the collector of said transistor approaches ground potential. Once saturation of the transistor is attained, a further increase, within certain limits, of the amplitude of the reference signal supplied to the base of the transistor will not produce any appreciable change in the current therethrough. Similarly, the input signal will not produce any change in the current through the transistor since the transistor is in the saturated condition. Consequently, the potential of the collector, which constitutes the output of the device, will drop to a low value which is dominated completely by the reference signal and remains constant regardless of input signal.

On the other hand, during the negative excursion of the reference signal the transistor will be caused to be in its operative range for the following reasons.

When the reference signal enters its negative excursion it will be blocked from the base electrode by the effect of the diode connected between the reference signal source and the base electrode. Consequently, the potential of the base electrode will be determined by the aforementioned voltage divider means which will bias at the base electrode in the operating range of the transistor, thus causing the collector electrode potential to rise above the saturated condition level. The input signal is also being supplied to the base electrode and since the transistor is in its operating range such input signal will cause a variation in the collector voltage. More specifically, since the input signal has either a 0° or 180° phase relationship with the reference signal, the said input signal will function to either increase or decrease the average D-C potential of the collector voltage during the negative excursion of the reference signal.

In accordance with another feature of the invention, the invention can be employed as a phase detector capable of detecting phase differences of 0° to 360° between two applied signals. Such a function is attained by providing means for amplifying and squaring the input signal so that it will be of sufficient amplitude to saturate the transistor in its positive excursion and, alternatively, to either cut off the transistor or lower the base potential of the transistor to the operating range of the input signal. To accomplish such purpose a diode can be inserted between the input signal source and the base of the transistor similar to the diode between the reference signal source and the transistor base.

The above-mentioned and other objects and features of the invention will be more readily understood from the following detailed description thereof when read in conjunction with the drawings in which.

Figure 1:
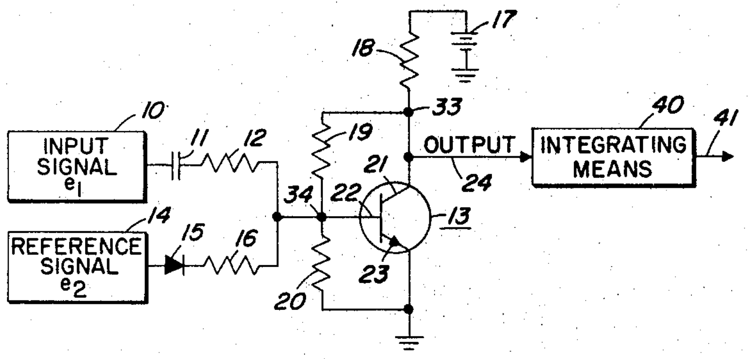
FIG. 1 is a schematic diagram of one form of the invention.

Referring now to FIG. 1, a square-wave reference signal $e_2$ is supplied from source 14 through diode 15 and resistor 16 to the base 22 of NPN type transistor 13. Also supplied to said base 22 is an input signal $e_1$ from source 10 through capacitor 11 and resistor 12.

The input signal $e_1$ must have the same frequency as the reference signal $e_2$ and, furthermore, when the circuit is functioning as a bi-phase demodulator, the phase of input signal $e_1$ must either be the same as the phase of signal $e_2$, or it must be 180° out-of-phase therewith. In addition, the input signal $e_1$ should approximate a sine wave, although other waveforms could be employed as will be evident from the following description.

It should be noted that the reference signal $e_2$ has a peak-to-peak amplitude which is appreciably larger than the peak-to-peak amplitude of the input signal $e_1$. The reason for the large amplitude of reference signal $e_2$ is because the reference signal must function to saturate transistor 13 on its positive excursion. The amplitude of the negative excursion is not particularly important, except that it must decrease below the D-C bias potential of base 22. However, when generating a square wave it is easiest to generate a waveform whose positive excursion is equal to its negative excursion.

The input signal $e_1$, on the other hand, does not function to saturate transistor 13 but is of an amplitude to drive the transistor 13 within its normal operating range.

Connected between the positive terminal battery 17 and ground are three resistors; e.g., resistors 18, 19, and 20, which form a voltage divider circuit with taps 33 and 34 thereon. The collector 21 of transistor 13 is connected to tap 33, which also provides the point from which the output signal is taken via the output terminal 24. The base of transistor 13 is connected to tap 34 between resistors 19 and 20 and, in the absence of any signal supplied from either input signal source 10 or reference signal source 14, such base will be biased at a point within the normal operating range of transistor 13.

Figures 4, 5, 6, 7, 8, 9:
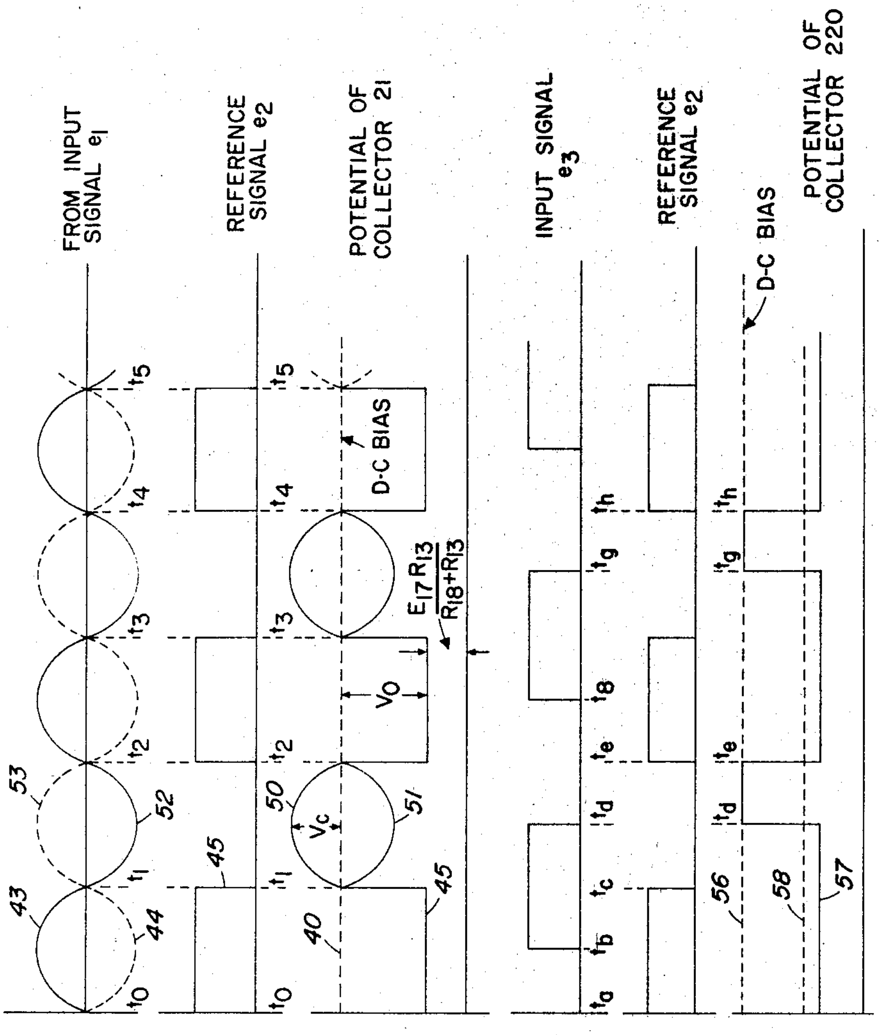
FIGS. 4 and 5 show the input signal and the reference signal, respectively, employed in the circuit of FIG. 1.
FIG. 6 is a waveform of the output signal of the circuit of FIG. 1.
FIGS. 7 and 8 shows the input signals to the circuit of FIG. 2 which is employed as a continuous range phase detector.
FIG. 9 shows the output waveform of FIG. 2.

The waveform of reference signal $e_2$ supplied from source 14 is shown in FIG. 5 and can be seen to be a square wave. As indicated above, the amplitude of waveform $e_2$ is sufficient to cause saturation of transistor 13 during its positive excursion, as during the time interval $t_0$–$t_1$, for example. During this time interval transistor 13 will have a low internal resistance $R_{13}$. Since resistor 19 is of the order of several megohms compared with the very low resistance of transistor 13, the D-C output potential on output terminal 24 will be determined almost entirely by the ratio of resistor 18 to resistor $R_{13}$ and will have a value as indicated by the level 45 in FIG. 6.

During the time that the positive excursion of the reference signal saturates transistor 13, the input signal $e_1$ will have no appreciable effect on the potential of collector 21 of the transistor since that transistor is already in the state of saturation.

However, during the negative excursion of reference signal $e_2$ as is shown, for example, during time interval $t_1$–$t_2$ of FIG. 5, transistor 13 is caused to operate in its normal operating range. More specifically, diode 15 will block the negative excursion of reference signal $e_2$ from reaching base 22 of transistor 13. Consequently, the D-C potential of the collector of transistor 13 at this time is determined entirely by battery source 17 and the values of resistors 18, 19, and 20 which form a voltage divider. The values of resistors 18, 19, and 20 are selected so that the biasing potential of tap 34 will cause transistor 13 to operate in its normal operating range and, in the absence of an input signal $e_1$, will produce an output voltage on collector 21 at the value indicated by level 40 of FIG. 6.

However, input signal $e_1$ from source 10 is superimposed on the D-C bias supplied to base 22 and functions to produce a variation of collector potential. More specifically, if the phase of input signal $e_1$ is as shown by curve 43 of FIG. 4, input signal $e_1$ will undergo a negative excursion during time interval $t_1$–$t_2$ to produce an increase in collector potential, indicated by curve 50 during time interval $t_1$–$t_2$, and shown in FIG. 6.

If, on the other hand, the phase of input signal $e_1$ is as shown by the dotted curve 44 of FIG. 4, then $e_1$ will have a positive excursion during time interval $t_1$–$t_2$ to produce a decrease in collector potential as represented by curve 51 of FIG. 6 during time interval $t_1$–$t_2$.

The difference in the magnitude of the D-C signal component appearing at collector 21 in FIG. 1 determines the phase relation between $e_1$ and $e_2$. It is apparent from FIG. 6 that the waveform including curve 50 has a larger D-C component than the waveform incorporating curve 51. In FIG. 1 integrator 40 extracts the D-C component from the output signal of transistor 13 and supplied such D-C component to a suitable load means through output terminal 41.

The mathematical expressions for the two cases where the input signal is in phase with the reference signal and where the input signal is out-of-phase with the reference signal are as follows:

$$e_{\text{in-phase}}=\frac{V_0}{2}+\frac{E_{17}R_{13}}{R_{18}+R_{13}}-V_c\int_0^{\pi}\sin(2\pi ft)\,dt=\frac{V_0}{2}+\frac{E_{17}R_{13}}{R_{18}+R_{13}}-\frac{V_c}{\pi} \quad (1)$$

$$e_{\text{out-of-phase}}=\frac{V_0}{2}+\frac{E_{17}R_{13}}{R_{18}+R_{13}}+V_c\int_0^{\pi}\sin(2\pi ft)\,dt=\frac{V_0}{2}+\frac{E_{17}R_{13}}{R_{18}+R_{13}}+\frac{V_c}{\pi} \quad (2)$$

Where $V_0$ is the potential difference of collector 21 between the conditions of saturation of transistor 13 and the normally biased condition of transistor 13 in the absence of both reference input signals, $E_{17}$ is the potential of battery source 17, $R_{13}$ is the shorted resistance of transistor 13 and $V_c$ is the peak voltage appearing at collector 21 due solely to the effect of input signal $e_1$.

Figure 2:
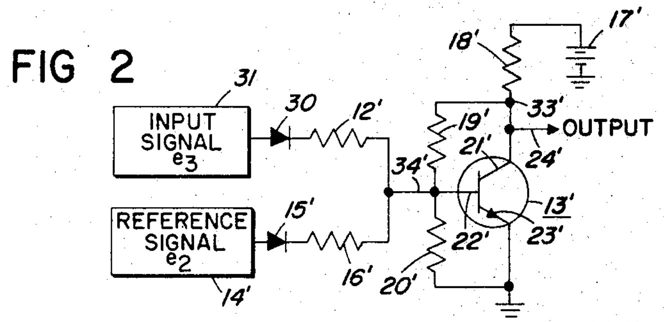
FIG. 2 is a schematic diagram of a second form of the invention using an NPN type transistor.

Referring now to FIG. 2, there is shown an adaptation of the invention which functions as a phase demodulator over the entire range of possible phase differences from 0° to 360°. In FIG. 2 diode 30 has been substituted for capacitor 11 of FIG. 1. Furthermore, the input signal source 31 is constructed to produce a square-wave output of a magnitude to saturate the transistor 13' on its positive excursion as is the case of the positive excursion of reference signal $e_2$ from source 14'.

FIGS. 7 and 8 represent the outputs of sources 31 and 14' respectively, and are shown as being somewhere near 90° out-of-phase. With the structure of FIG. 2, the transistor 13' will be saturated during the positive excursion of either the input signal $e_3$ from source 31 or reference signal $e_2$ from source 14'. It is only during those periods of time when neither signal source is in its positive excursion that the potential of collector 21' will rise to the level 56' as shown in FIG. 9, as for example, during time interval $t_d$–$t_e$. At all other times the potential level of collector 21' will be at the lower level indicated by the line 57. The average D-C level, which is variable and is indicated by dotted line 58, represents the phase difference between the signals of FIG. 7 and FIG. 8.

Figure 10:
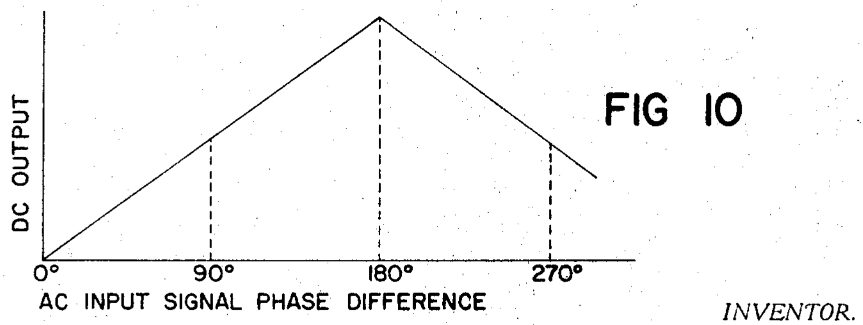
FIG. 10 shows the phase vs. output voltage characteristic of the circuit of FIG. 2.

The output of the circuit of FIG. 2 is linear with phase displacement as shown in FIG. 10. More specifically, in FIG. 10, when the phase difference between the two applied signals is zero degrees the D-C output is at its lowest value and is substantially equal to one-half the collector voltage of the transistor when in a non-conductive state. As the phase displacement between the two signals increases, the D-C output appearing at the transistor collector electrode increases linearly until it reaches a maximum when the phase relationship between the two signals is 180°, as shown in FIG. 10. As the phase displacement continues to increase, the D-C voltage decreases linearly as shown in FIG. 10.

Figure 3:
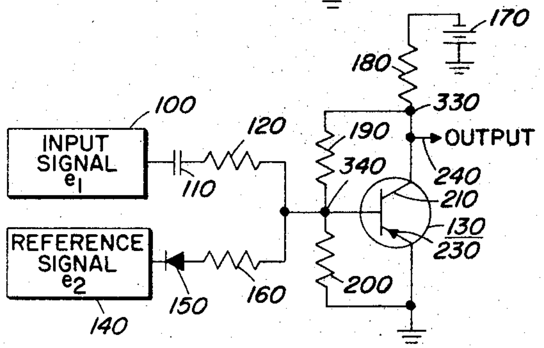
FIG. 3 is a schematic diagram of a third form of the invention using a PNP type transistor.

In FIG. 3 there is shown another form of the invention employing a PNP type transistor 130 rather than the NPN type transistor 13 of FIG. 1.

In FIG. 3 the circuit is quite similar to that of FIG. 1 and corresponding elements are identified by the same reference character although in the hundred series rather than the ten series. For example, the input signal source 10 of FIG. 1 is identified as the input signal source 100 in FIG. 3. The principal differences in the structures of FIG. 1 and FIG. 3 are that in FIG. 3 the diode 150 is poled opposite to the diode 15 in FIG. 1, and the battery source 170 is a negative battery source rather than a positive battery source.

The waveforms that are applicable to the circuit of FIG. 3 are similar (although not shown) to those shown in FIGS. 4, 5, and 6, except the polarities would be reversed.

I claim:

1. Phase detecting means comprising:

electron valve means having an electron emitting electrode, an electron collecting electrode, and an electron control electrode;

biasing means for biasing said electron control electrode into the normal operating range of said electron valve means;

first signal source means constructed to produce a first input signal of sufficient amplitude to saturate said electron valve means;

second signal source means for producing a second input signal;

voltage divider means comprising first and second resistive impedance means with a tap therebetween and having first and second end terminals;

means for connecting said tap to said electron control electrode;

first coupling means comprising diode means for supplying said first input signal to said first end terminal of said voltage divider means;

second coupling means for supplying said second input signal to said second end terminal of said voltage divider means;

and means for extracting the D-C component from the output signal of said electron valve means.

2. Phase detecting means in accordance with claim 1 in which said first signal source is constructed to produce a two-level output signal with one of said levels of sufficient amplitude to saturate said electron valve means.

3. Phase detecting means in accordance with claim 2 in which said second coupling means comprises second diode means for supplying said second signal means to said electron control electrode.

4. Phase detecting means in accordance with claim 3 in which said second signal means is a two-level signal with one of said levels of sufficient amplitude to saturate said electron valve means.

References Cited

UNITED STATES PATENTS

| | | | |
|---|---|---|---|
| 2,866,105 | 12/1958 | Eckert | 307—300 X |
| 3,042,872 | 7/1962 | Brahm | 329—50 |
| 3,133,208 | 5/1964 | Lentz | 307—300 X |
| 3,185,931 | 5/1965 | Collins | 329—103 |
| 2,943,271 | 6/1960 | Willis. | |

ALFRED L. BRODY, *Primary Examiner.*

U.S. Cl. X.R.

307—232, 243, 295; 328—133; 329—101, 103